United States Patent
Kellicker et al.

(10) Patent No.: US 10,140,105 B2
(45) Date of Patent: Nov. 27, 2018

(54) CONVERTING SOURCE CODE

(71) Applicant: WOWZA MEDIA SYSTEMS, LLC, Golden, CO (US)

(72) Inventors: Scott Kellicker, Worthington, OH (US); Jan Borgersen, San Jose, CA (US)

(73) Assignee: WOWZA MEDIA SYSTEMS, LLC, Golden, CO (US)

( * ) Notice: Subject to any disclaimer, the term of this patent is extended or adjusted under 35 U.S.C. 154(b) by 0 days.

(21) Appl. No.: 15/067,003

(22) Filed: Mar. 10, 2016

(65) Prior Publication Data

US 2017/0262265 A1    Sep. 14, 2017

(51) Int. Cl.
*G06F 9/44* (2018.01)
*G06F 8/51* (2018.01)

(52) U.S. Cl.
CPC ...................... *G06F 8/51* (2013.01)

(58) Field of Classification Search
None
See application file for complete search history.

(56) References Cited

U.S. PATENT DOCUMENTS

| | | | | |
|---|---|---|---|---|
| 5,390,314 A * | 2/1995 | Swanson | ............ | G06F 9/45512 717/138 |
| 6,317,871 B1 * | 11/2001 | Andrews | ............ | G06F 8/51 717/137 |
| 6,516,461 B1 * | 2/2003 | Ichisugi | ............ | G06F 8/51 717/137 |
| 7,337,438 B1 * | 2/2008 | Dobbins | ............ | G06F 8/425 717/141 |
| 8,332,828 B2 * | 12/2012 | Vargas | ............ | G06F 8/51 717/136 |
| 9,304,893 B1 * | 4/2016 | Knjazihhin | ............ | G06F 11/3684 |
| 2003/0018956 A1 * | 1/2003 | Schwarcz | ............ | G06F 8/423 717/115 |
| 2003/0023755 A1 * | 1/2003 | Harris | ............ | G06F 17/30905 709/246 |
| 2004/0133878 A1 * | 7/2004 | Cole | ............ | G06F 9/45512 717/115 |
| 2004/0143823 A1 * | 7/2004 | Wei | ............ | G06F 8/41 717/140 |

(Continued)

OTHER PUBLICATIONS

List of languages that compile to JS—jashkenas/coffeescript Wiki—GitHub, https://github.com/jashkenas/coffeescript/wiki/List-of-languages-that-compile-to-JS, printed Jan. 28, 2015, 10 pages.

(Continued)

*Primary Examiner* — Insun Kang
(74) *Attorney, Agent, or Firm* — Toler Law Group, PC

(57) ABSTRACT

A method includes receiving source code in a first programming language. The method further includes identifying a design pattern based on a flag included in the source code. The method further includes generating a first translation of the source code in a second programming language, where at least a portion of the second file conforms to the design pattern. The method further includes generating a second translation of the source code in a third programming language. The method further includes outputting first data based on the first translation to a first device and second data based on the second translation to a second device.

20 Claims, 6 Drawing Sheets

(56) References Cited

U.S. PATENT DOCUMENTS

| | | | | |
|---|---|---|---|---|
| 2004/0154004 A1* | 8/2004 | Maine | G06F 8/51 | 717/136 |
| 2004/0158822 A1* | 8/2004 | Sandham | G06F 9/45537 | 717/138 |
| 2004/0205729 A1* | 10/2004 | Iwashita | G06F 8/41 | 717/136 |
| 2005/0022161 A1* | 1/2005 | Burger | G06F 9/4428 | 717/108 |
| 2007/0226087 A1* | 9/2007 | Marfatia | G06F 8/51 | 705/28 |
| 2007/0271553 A1* | 11/2007 | Higgins | G06F 8/53 | 717/136 |
| 2008/0127127 A1* | 5/2008 | Chitgupakar | G06F 8/51 | 717/137 |
| 2008/0235661 A1* | 9/2008 | Arpana | G06F 8/30 | 717/116 |
| 2008/0313532 A1* | 12/2008 | Dames | G06F 17/2247 | 715/239 |
| 2009/0125873 A1* | 5/2009 | Simon | G06F 8/75 | 717/101 |
| 2009/0313004 A1* | 12/2009 | Levi | G06F 8/30 | 703/28 |
| 2010/0082706 A1* | 4/2010 | Lim | G06F 17/30569 | 707/809 |
| 2010/0083228 A1* | 4/2010 | Branda | G06F 11/3466 | 717/120 |
| 2010/0153933 A1* | 6/2010 | Bohlmann | G06F 8/73 | 717/144 |
| 2011/0296388 A1* | 12/2011 | Rohde | G06F 11/3604 | 717/131 |
| 2012/0151437 A1* | 6/2012 | Kneisel | G06F 8/31 | 717/114 |
| 2012/0317554 A1* | 12/2012 | Mulat | G06F 11/3608 | 717/131 |
| 2013/0007701 A1* | 1/2013 | Sundararam | G06F 11/3604 | 717/109 |
| 2013/0104112 A1* | 4/2013 | Novillo | G06F 8/42 | 717/151 |
| 2013/0159982 A1* | 6/2013 | Lerios | G06F 8/423 | 717/146 |
| 2013/0326326 A1* | 12/2013 | Greer | G06F 8/73 | 715/230 |
| 2013/0339930 A1* | 12/2013 | Xu | G06F 11/3684 | 717/125 |
| 2014/0067750 A1* | 3/2014 | Ranganathan | G06F 17/30592 | 707/602 |
| 2014/0109067 A1* | 4/2014 | Flicker | G06F 8/423 | 717/142 |
| 2014/0165039 A1* | 6/2014 | Asadullah | G06F 8/36 | 717/123 |
| 2014/0189663 A1* | 7/2014 | Guenthner | G06F 8/456 | 717/146 |
| 2014/0215446 A1* | 7/2014 | Araya | G06F 8/76 | 717/137 |
| 2014/0282373 A1* | 9/2014 | Garza | G06F 8/51 | 717/106 |
| 2014/0282424 A1* | 9/2014 | Sheridan | G06F 11/3604 | 717/127 |
| 2015/0234642 A1* | 8/2015 | Araya | G06F 8/51 | 717/137 |
| 2015/0363176 A1* | 12/2015 | Sheng | G06F 8/42 | 717/143 |
| 2016/0062753 A1* | 3/2016 | Champagne | G06F 8/51 | 717/137 |
| 2017/0060541 A1* | 3/2017 | Saleh | G06F 8/34 | |
| 2017/0139690 A1* | 5/2017 | Pesarese | G06F 8/41 | |
| 2017/0168786 A1* | 6/2017 | Beckey | G06F 8/41 | |

OTHER PUBLICATIONS

GWT Overview, http://www.gwtproject.org/overview.html, printed Jan. 28, 2015, 2 pages.
j2as3 Java to ActionScript 3 converter, https://code.google.com/p/j2as3/wiki/PageName, printed Jan. 28, 2015, 2 pages.
Change I0f995d10: Implemented handling of GwtIncompatible annotations, gwt-review, https://gwt-review.googlesource.com/, printed Jan. 28, 2015, 3 pages.
Tree, Wikipedia, the free encyclopedia, http://en.wikipedia.org/wiki/Abstract_syntax_tree, printed Jan. 28, 2015, 4 pages.
Getting Started—gwt-explorer—Use gwt metadata annotations to export GWT Java classes as a JS API, http://code.google.com/p/gwt-exporter/wiki/GettingStarted, printed Jan. 28, 2015, 9 pages.

* cited by examiner

302

308

```
@ConvertToRevealingPrototype
public class Human {
        private String name;
        public Human (String n) {
                name = n;
        }
        public String getName() {
                return name;
        }
}
```

Source Code

304

```
function Human(n) {
        this.name = n;
}

Human.prototype = function () {
                getName = function() {
                        return name;
                }
        }
}
```

First Translation

306

```
public class Human {
        private var name: String;
        public Human (n: String) {
                name = n;
        }
        public String getName() {
                return name;
        }
}
```

Second Translation

```
import org.junit.*;
@ConvertToUnitTest
public class TestHuman {
        private static final String name = "Gary";
        @Test
        public void testName() {
                Human gary = new Human(name);
                //Verify name
                UnitTests.Assert.assertEquals("I'm not Gary!", name, gary.getName());
        }
}
```
Source Code

404

```
module("TestHuman",
{
        setup: function()
        {}
        teardown: function ()
        {}
});
test("testName", function()
{
        var gary = new Human(name);
        UnitTests.Assert.assertEquals("I'm not Gary!", name, gary.getName());
});
var name = "Gary";
```
First Translation

406

```
package
{
        import utilities.*;
        import annotations.*;
        import UnitTests;
        [ConvertToUnitTest] public class TestHuman
        {
                private static const name: String = "Gary";
                [Test] public function testName(): void
                {
                        var gary: Human = new Human(name);
                        //Verify name
                        UnitTests.Assert.assertEquals("I'm not Gary!", name, gary.getName());
                }
        }
}
```
Second Translation

*FIG. 4*

CONVERTING SOURCE CODE

BACKGROUND

The popularity of the Internet, coupled with the increasing capabilities of personal/mobile electronic devices, has provided consumers with the ability to enjoy content almost anytime and anywhere. For example, multimedia content, such as live content (e.g., sports events) and video on demand (VOD) content (e.g., television shows and movies), can be delivered via the Internet to personal electronic devices (e.g., computers, mobile phones, Internet-enabled televisions, etc.). Various types of personal electronic devices are available to consumers. Different devices may support applications (e.g., video players) written in different programming languages.

In order to distribute a particular software application (e.g., a video player) to a variety of different types of devices or platforms that support different programming languages, developers may develop multiple versions of the application using the different programming languages. Therefore, supporting a large number of different platforms may require a large number of different versions to be developed. Developing multiple versions of one application may be time consuming and may lead to errors being introduced in different versions of the application. Such errors may not be consistent across versions. Furthermore, each time an error is fixed or a feature is added to the application, the fix or added feature may need to be applied to more than one version of the application. Applying fixes and updates to multiple versions of the application may be cumbersome.

SUMMARY

One method of creating multiple versions of an application in different programming languages is to use a converter to convert source code into multiple different languages. The present disclosure describes conversion techniques that may enable a computing device (e.g., a media server, a personal computer, a mobile device, such as a mobile phone, etc.) to convert source code into more than one target programming language. Output of the converter may be controlled by flags (e.g., indicators) included in the source code. Such flags may cause the converter to ignore particular portions (e.g., a class or a method) of the source code during conversion. Another flag may indicate that a portion (e.g., a class) of the source code is not to be converted, but a functionality of the portion is to be provided by an existing library in the target language. As another example, a flag may identify a design pattern to be used by the converter when creating a translation of the source code. Furthermore, a flag may indicate that a portion of the source code corresponds to one or more unit tests that are to be converted to unit tests in the target programming language. Thus, the converter may facilitate development for more than one programming language.

BRIEF DESCRIPTION OF THE DRAWINGS

FIG. 3 is a diagram illustrating a particular embodiment of source code and converted translations of the source code;

FIG. 4 is another diagram illustrating a particular embodiment of source code and converted translations of the source code;

DETAILED DESCRIPTION

Figure 1:
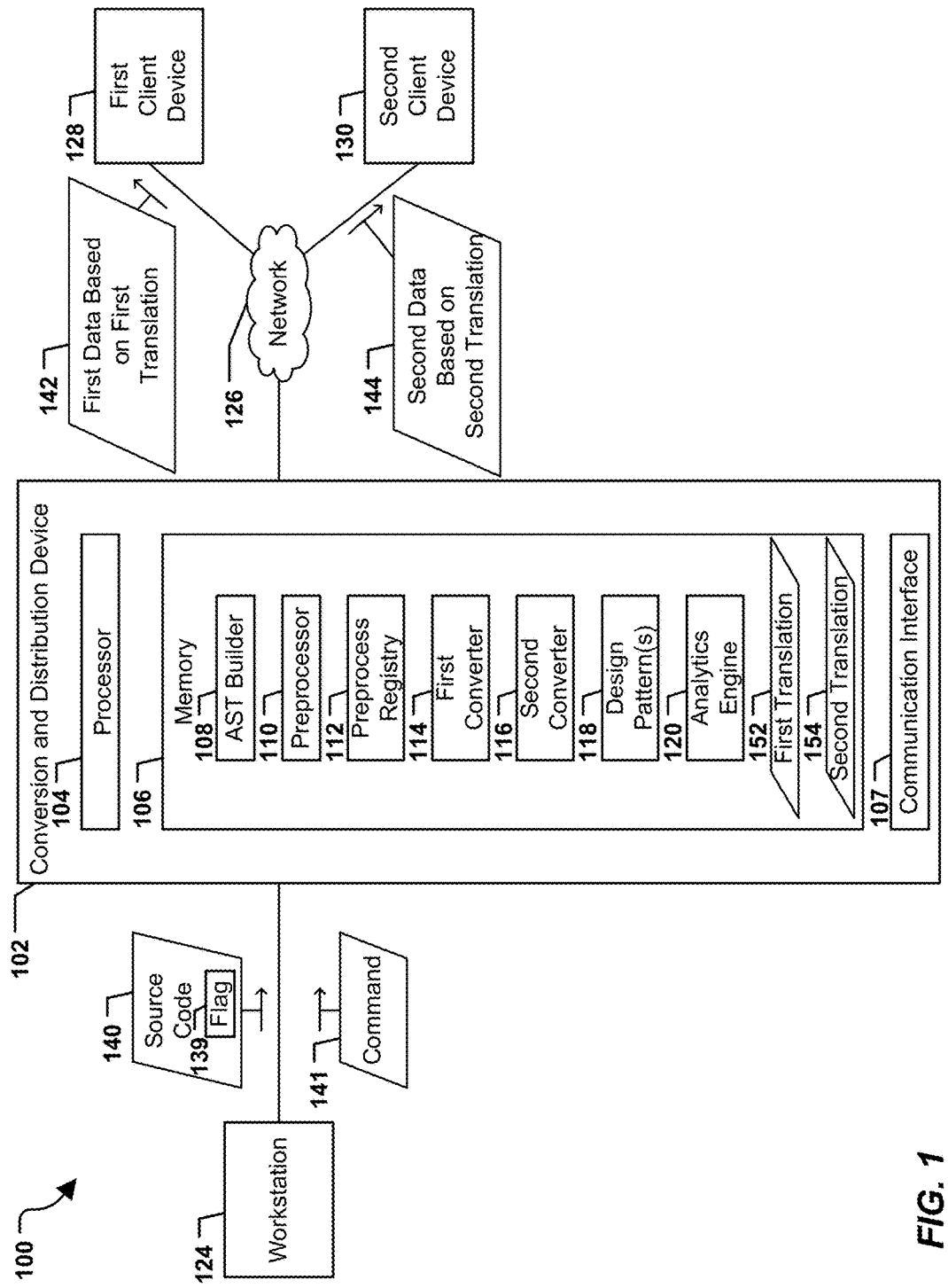
FIG. 1 is a diagram of a particular embodiment of a system that is operable to convert and distribute an application.

FIG. 1 illustrates a particular embodiment of a system 100 that is operable to convert and distribute an application. The system 100 includes a conversion and distribution device 102. The conversion and distribution device 102 may correspond to a computing device, such a server computer, a desktop computer, a laptop computer, a mobile phone, another computing device, or a combination thereof. While the conversion and distribution device 102 is illustrated as a single device, in some implementations, the conversion and distribution device 102 includes more than one device. For example, the conversion and computing device 102 may include more than one server computer. The conversion and distribution device 102 includes a processor 104, a memory 106, and a communication interface 107. One or more of the processor 104, the memory 106, and the communication interface 107 may correspond to more than one component (e.g., may be distributed across one or more devices).

The processor 104 may include a central processing unit (CPU), such as a single-core processor or a multi-core processor. The memory 106 may include random access memory (RAM), a hard disk drive, a flash memory drive, a solid-state drive, another type of storage device, or a combination thereof. The memory 106 may store data and software corresponding to an abstract syntax tree (AST) builder 108, a preprocessor 110, a preprocess registry 112, a first converter 114, a second converter 116, one or more design pattern(s) 118, and an analytics engine 120.

Figure 2:
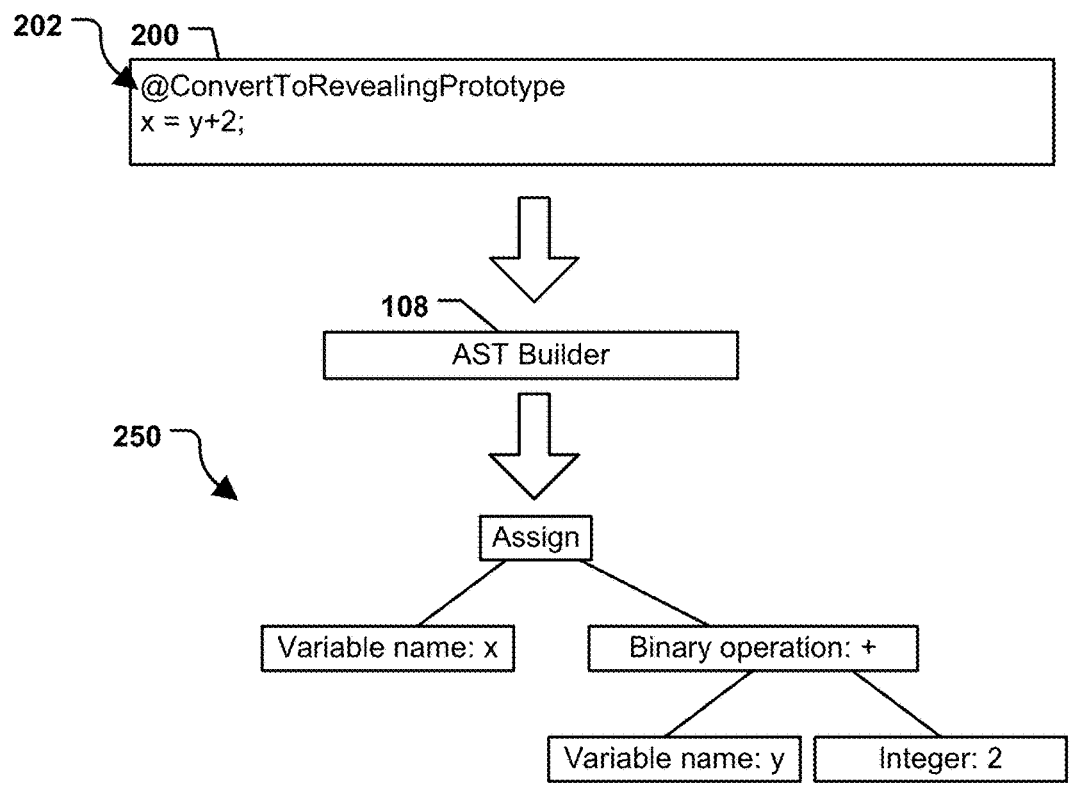
FIG. 2 is a diagram illustrating an example of generation of an abstract syntax tree in a system that is operable to convert and distribute an application.

The AST builder 108 may correspond to instructions that, when executed by the processor 104, cause the processor 104 to generate an AST based on input source code. An AST may include a plurality of nodes arranged in a tree structure. Each node of the AST may correspond to a syntactic construct in the input source code. An example of an AST is illustrated in FIG. 2. The generated AST may describe relationships between classes, methods, attributes, or a combination thereof included in the input source code or related to the input source code. The AST builder 108 may cause the processor 104 to generate one or more ASTs based on the input source code. Each AST generated by the AST builder 108 may correspond to individual files (or classes) or to a group of files (or classes). In a particular embodiment, the AST builder 108 may generate an AST for each class included in the source code, an AST for each file included in the source code, and a "top level" AST descriptive of the source code as a whole. For example, the top level AST may include the other ASTs as nodes.

The preprocessor 110 may cause the processor 104 to traverse each AST generated by the AST builder 108 to determine relationships between classes represented by the ASTs (e.g., class hierarchy, implemented interfaces, methods and fields included in the classes, etc.). The processor 104 may store the relationships in the preprocessor registry 112. In particular examples, the preprocessor 110 may identify utility classes relied on by the input source code and corresponding utility classes written in one or more target languages. Furthermore, the preprocessor 110 may be configured to identify situations where input source code cannot be converted into a target language. For example, the input source code may include one or more overloaded methods, and a target language may not support overloaded methods. The preprocessor 110 may further identify one or more flags included in the source code that indicate that a portion of the source code should be ignored during conversion. Thus, the preprocessor register 112 may identify portions of code referenced by (e.g., via import statements) the source code, may identify portions of the source code to ignore during conversion, may identify portions of the source code that are not convertible, etc.

The first converter 114 may cause the processor 104 to translate input source code in a first programming language (e.g., Java®) to code in a second programming language (e.g., JavaScript®) (Java and JavaScript are registered trademarks of Oracle America, Inc. of Redwood Shores, Calif.). The first converter 114 may convert the input source code based on ASTs generated by the AST builder 108, based on information stored in the preprocess registry 112, based on flags (e.g., indicators) included in the input source code, based on semantic rules included in or accessible by the first converter 114, or a combination thereof. Similarly, the second converter 116 may cause the processor 104 to translate the input source code in the first programming language to code in a third programming language (e.g., ActionScript®) (ActionScript is a registered trademark of Adobe Systems Incorporated of San Jose, Calif.). The second converter 116 may translate the input source code based on the ASTs generated by the AST builder 108, based on the information stored in the preprocess registry 112, based on the flags (e.g., indicators) included in the input source code, based on semantic rules included in or accessible by the second converter 116, or a combination thereof. The memory 106 may store more converters corresponding to different programming languages. Accordingly, the conversion and distribution device 102 may support conversion of source code to any number of programming languages. In particular examples, which of the converters 114, 116 are utilized by the conversion and distribution device 102 is based on a command received at the conversion and distribution device 102 (e.g., from a workstation). Thus, less than all of the converters included in the memory 106 may be used to convert particular source code in certain situations. The above described example includes Java as the first programming language, but different implementations may enable conversion of a different programming language. Further, in some implementations, the target programming languages may include additional or different programming languages than JavaScript and ActionScript.

In particular implementations, the converters 114 and 116 cause the processor 104 to use a visitor pattern to traverse each AST generated based on the input source code. The visitor design pattern may separate an algorithm (e.g., generating translated output code based on nodes of an AST) from the objects the algorithm operates on (e.g., nodes of the AST). To illustrate, the converters may 114, 116 may each include one or more node visitor classes. Each node visitor class may define methods corresponding to a plurality of node types. Each converter 114 and 116 may convert source code to a target language based on a generated AST by using one or more node visitor classes to generate output based on (e.g., visit) each node in the AST. The converters 114, 116 may process each visited node of an AST based on rules included in each of the converters 114, 116. The rules included in the converters 114, 116 may include rules associated with flags that may be included in the input source code. For example, a "@ConvertToRevealingPrototype" flag may instruct one or more of the converters 114, 116 to use a revealing prototype design pattern when translating the input source code to a target programming language. A translation generated according to a design pattern may "conform" to the design pattern. That is, the translation may follow a pattern or description specified by the design pattern. For example, the revealing prototype design pattern may use prototypes to simulate objected oriented programming in programming languages that do not implement classes. A translation that conforms to the revealing prototype pattern may utilize the revealing prototype pattern to simulate object oriented programming with prototypes. Other flags may instruct one or more of the converters 114, 116 to implement other design patterns, such as a revealing module pattern, a prototype pattern, some other design pattern, or a combination thereof. The prototype pattern may clone objects based on a template. Code written according to the revealing module pattern may include private functions and/or private variables. An anonymous object with pointers to "revealed" private functions or methods may enable access to the revealed private functions and/or variables. Rules for implementing the different design patterns may be stored in the data corresponding to the design patterns 118.

A "@ConvertToUnitTest" flag may cause one or more of the converters 114, 116 to convert a portion of the input source code to one or more unit tests in a target programming language. A "@CoreLibraryClass" flag may cause one or more of the converters 114, 116 to ignore a portion (e.g., a class) of the input source code during conversion (e.g., because the class is to be provided by a target platform). The preprocessor 110 may identify corresponding functionality in the programming language associated with the converter 114, 116. A "@IgnoreClass" flag may cause one or more of the converters 114, 116 to ignore a portion (e.g., a class) of the input source code during conversion and may cause the preprocessor 110 to ignore the portion during preprocessing. A "@NameSpace" flag may cause one or more of the converters 114, 116 to place translated classes, methods, attributes, or a combination thereof in a designated namespace. The flags listed above are provided as non-limiting examples. More or fewer flags may be supported by the system 100. It should be noted that particular flags may be ignored by a converter. For example, the revealing prototype pattern may be useful for simulated objected oriented programming in non-objected oriented programming languages. Therefore, a converter configured to generate a translation of input source code to an objected oriented programming language may ignore, or may respond differently to, the @ConvertToRevealingPrototype flag.

The analytics engine 120 may cause the processor 104 to perform static code analysis of input source code, translated code output by the first converter 114, translated code output by the second converter 116, or a combination thereof. The analytics engine 120 may generate one or more suggestions or comments based on the static code analysis. Examples of analysis tools that may be used by the analytics engine include JSLint and JSHint. While JSLint and JSHint are JavaScript® tools, other static analysis tools may be used in addition or in the alternative.

The system 100 further includes a workstation 124. The workstation 124 may be in communication with the conversion and distribution device 102. While shown in FIG. 1 as directly coupled to the conversion and distribution device 102, the workstation 124 may alternatively communicate with the conversion and distribution device 102 via a network. The workstation 124 may include a computing device, such as a desktop computer, a laptop computer, a tablet computer, a mobile telephone, or another type of computing device. In some examples, the workstation 124 and the conversion and distribution device 102 correspond to the same device.

The system 100 further includes a first client device 128 and a second client device 130. One or both of the client devices 128, 130 may include a computing device, such as a desktop computer, a "smart" television, a set-top box device, a laptop computer, a tablet computer, a mobile telephone, or another type of computing device. The first client device 128 may support use of a first programming language, and the second client device 130 may support use of a second programming language that is different from the first programming language. As used herein, a device may support a programming language when the device is configured to execute code written in the programming language either with or without further translation (e.g., interpretation or compilation). In particular examples, the first client device 128 and the second client device 130 may be the same device. The first client device 128 and the second client device 130 may communicate with the conversion and distribution device 102 via a network 126, such as the Internet. In particular embodiments, the conversion and distribution device 102 supports generation and delivery of application versions compatible with Adobe Flash®, ActionScript®, hypertext markup language (HTML), JavaScript®, Android®, Java®, iOS®, ObjectiveC, or a combination thereof (Adobe Flash® is a registered trademark of Adobe Systems Incorporated of San Jose, Calif., Android® is a registered trademark of Google Inc. of Mountain View, Calif., and iOS is a registered trademark of Cisco Systems, Inc. of San Jose, Calif. and is used by Apple Inc. of Cupertino, Calif. under license).

In operation, the conversion and distribution device 102 may receive, for example via the communication interface 107, source code 140 from the workstation 124. For example, a programmer may input the source code 140 and input a command causing the workstation 124 to transmit the source code 140 to the conversion and distribution device 102. The source code 140 may be represented in a first programming language. In particular examples, the first programming language includes an objected oriented programming language, such as Java®. The source code 140 may include a flag 139. The flag 139 may indicate, for example, that a translation of the source code 140 is to be output using the revealing prototype pattern, as further described with reference to FIG. 3. In particular examples, the source code 140 may include multiple flags of differing types, as described in more detail below. In some examples, the source code 140 may include code corresponding to a video player application.

The conversion and distribution device 102 may further receive, for example via the communication interface 107, a command 141 from the workstation 124 (e.g., transmitted based on user input received at the workstation 124). The command 141 may identify one or more files included in the source code 140 that are to be converted from the first programming language to one or more other programming languages. In some embodiments, the command 141 identifies the other programming languages. In some examples, the command 141 includes one or more flags (such as the flag 139). For example, the flag 139 may be included in the command 141 instead of in the source code 140. Alternatively, the command 141 may include flags that are additional to any flags included in the source code 140.

In response to receiving the source code 140 and the command 141, the processor 104 may execute the AST builder 108 to generate one or more ASTs based on the source code 140. Since the AST represents a structure of the source code 140, the AST may serve as an intermediary to facilitate translation into one or more programming languages. The preprocessor 110 may cause the processor 104 to traverse each AST generated by the AST builder 108 to determine relationships between classes represented by the ASTs (e.g., class hierarchy, implemented interfaces, and methods and fields included in the classes). The processor 104 may store the relationships in the preprocess registry 112. In particular embodiments, the processor 104 may execute the AST builder 108 without receiving the command 140. To illustrate, the processor 104 may execute the AST builder 108 automatically upon the conversion and distribution device 102 receiving the source code 140.

Based on the ASTs, the preprocess registry 112, the flag 139, or a combination thereof, the first converter 114 may generate a first translation 152 of the source code 140. The first translation 152 may correspond to a second programming language different from the first programming language. In a particular example, the first translation 152 or a portion of the first translation 152 is generated by the first converter 114 using a design pattern (of the design patterns 118) indicated by the flag 139. For example, functionality of one or more classes included in the source code 140 may be translated by the first converter 114 to the second programming language (e.g., a programming language that does not support object oriented programming) using the revealing prototype pattern based on the flag 139.

Based on the ASTs, the preprocess registry 112, the flag 139, or a combination thereof, the second converter 116 may generate a second translation 154 of the source code 140. The second translation 154 may correspond to a third programming language different from the first programming language and different from the second programming language. In a particular example, the second translation 154 or a portion of the second translation 154 is generated by the second converter 116 using a design pattern (of the design patterns 118) indicated by the flag 139. In some examples, the flag 139 may be ignored by one or more of the converters 114, 116.

One or both of the converters 114, 116 may generate a translation of the source code 140 based on context. For example, the first programming language may not support a particular operator (e.g., a strict equality operator), but the second programming language or the third programming language may support the particular operator. One or both of the converters 114, 116 may include the particular operator in a translation of the source code 140 based on context (e.g., what type of operands are being compared in a particular statement).

The analytics engine 120 may perform static code analysis of the source code 140, the first translation 152, the second translation 154, or a combination thereof. The results of the static code analysis may be output to the workstation 124 or to a display device associated with the conversion and distribution device 102. To illustrate, the analytics engine 120 may output a number of functions included in a file, a number of statements included in a function, etc. In addition, the first translation 152 and/or the second translation 154 may be automatically edited by the analytics engine 120 (e.g., to make the first translation 152 and/or the second translation 154 more easily readable for a human). In some examples, the analytics engine 120 may include comments or other documentation in the first translation 152 and/or the second translation 154. The comments or other documentation may be based on source comments or documentation included in the source code 140. In some examples, the comments and or documentation may be automatically generated. To illustrate, the analytics engine 120 may insert a particular comment in response to the flag 139 (e.g., the particular comment may identify a design pattern indicated by the flag 139). Further, the comments and or documentation may be automatically detected based on functions detected (e.g., by the analytics engine 120) in the source code 140 or inserted into the first translation 152 and/or the second translation 154.

In addition to the results determined by the analytics engine 120, the conversion and distribution device 102 may output errors detected by the AST builder 108, the preprocessor 110, the first converter 114, the second converter 116, or a combination thereof, to the workstation 124. Error messages may include a filename, a line number, an error description, a line of code that caused the error, or a combination thereof.

The conversion and distribution device 102 may store the first translation 152 and the second translation 154 in the memory 106 or in another storage device or memory. The translations 152, 154 may correspond to machine language code. Alternatively, the translations 152, 154 may correspond to higher level programming languages or to a combination of machine language code and higher level programming languages.

The conversion and distribution device 102 may transmit, for example via the communication interface 107, first data 142 based on the first translation 152 to the first client device 128 and second data 144 based on the second translation 154 to the second client device 130 (e.g., in response to requests from the client devices 128 and 130). The first data 142 may include the first translation 152, a further translation of the first translation 152 (e.g., the first translation 152 converted into a lower level programming language), or a combination thereof. In a particular example, the first data 142 includes a first package corresponding to the first translation 152. For example, the conversion and distribution device 102 may include in the first package the first translation 152 (or a further translation of the first translation 152) as well as resources (e.g., code, image assets, video assets, sound assets, etc.) referenced in the first translation 152. The first package may be executable at the first client device 128. In alternate examples, the first client device 128 may be configured to build, based on the first data 142, a package including code or media needed to execute a program corresponding to the first translation 152. Similarly, the second data 144 may include the second translation 154, a further translation of the second translation 154 (e.g., the second translation 154 converted into a lower level programming language), or a combination thereof. In a particular example, the second data 144 includes a second package corresponding to the second translation 154. For example, the conversion and distribution device 102 may include in the second package the second translation 154 (or a further translation of the second translation 154) as well as resources (e.g., code, image assets, video assets, sound assets, etc.) referenced in the second translation 154. The second package may be executable at the second client device 130. In alternate examples, the second client device 130 may be configured to build, based on the second data 144, a package including code or media needed to execute a program corresponding to the second translation 154. Thus, the conversion and distribution device 102 may convert the input source code 140 to different programming languages supported by different client devices. The translations 152, 154 may be generated based on (e.g., using a design pattern indicated by) one or more flags included in the source code. Accordingly, the system 100 may enable relatively more consistent and faster generation of different versions of an application than manual generation of translations. Furthermore, the system 100 may enable a relatively greater degree of control of the form of the translations, such as by supporting various flags in the input source code.

FIG. 2 depicts an example of source code 200 and an abstract syntax tree (AST) 250 that may be generated from the source code 200 by the AST builder 108. It should be noted that the Java®-style source code 200 and the format of the AST 250 shown in FIG. 2 are for example only, and are not to be considered limiting. In alternative embodiments, the systems and methods of the present disclosure may be used with different types of source code and different types of ASTs or other platform-independent representations of source code. The source code 200 may correspond to the source code 140 and may include a flag 202 that corresponds to the flag 139. In particular embodiments, the flag 202 is not represented in the AST 250.

Referring to FIG. 3, a diagram illustrating source code and converted translations is shown. FIG. 3 depicts source code 302, a first translation 304 of the source code 302, and a second translation 306 of the source code 302. The source code 302 may correspond to the source code 140, the first translation 304 may correspond to the first translation 152, and the second translation 306 may correspond to the second translation 154. In the illustrated example, the source code 302 is written in Java®, the first translation 304 is written in JavaScript®, and the second translation 306 is written in ActionScript®.

As shown, the source code 302 includes a flag 308. Accordingly, one or more converters (e.g., the first converter 114, the second converter 116, etc.) may generate translations of the source code 302 based on the flag 308. In the illustrated example, the flag 308 indicates that a class "Human" is to be converted using the revealing prototype design pattern. Accordingly, the first translation 304 includes an implementation of functionality of the "Human" class using the revealing prototype design pattern. The second translation 306 may be a translation to an object oriented programming language. Accordingly, the flag 308 may be ignored, and the second translation 306 may not utilize the revealing prototype design pattern.

While the source code 302 is shown as including one flag, the source code 302 may include no flags or more than one flag. Each flag may be associated with a specific portion (e.g., one or more classes or methods) included in the source code 302. For example, the flag 308 may be associated specifically with the "Human" class included in the source code 302 and may therefore not apply to other classes (not shown in the source code 302).

Referring to FIG. 4, another diagram illustrating source code and converted translations is shown. FIG. 4 depicts source code 402, a first translation 404 of the source code 402, and a second translation 406 of the source code 402. The source code 402 may correspond to the source code 140, the first translation 404 may correspond to the first translation 152, and the second translation 406 may correspond to the second translation 154.

As shown, the source code 402 includes a flag 408. Accordingly, one or more converters (e.g., the first converter 114, the second converter 116, etc.) may generate translations of the source code 402 based on the flag 408. In the illustrated example, the flag 408 indicates that a "TestHuman" class is to be converted to unit tests in the programming languages corresponding to the translations 404 and 406. Accordingly, the first translation 404 includes a translation of a unit test included in the source code 402 to a unit test in a different programming language. Similarly, the second translation 406 includes a translation of the unit test included in the source code 402 to a unit test in a different programming language. Translating a unit test to a target language may include adding statements to import one or more packages associated with unit testing in the target language. To illustrate, the second translation 406 includes import statements 410 that have been added by a converter (e.g., the second converter 116) to import packages associated with unit testing in the programming language associated with the second translation 306. Thus, as shown in FIG. 4, converters that generate the translations may respond to a particular flag in different ways. In particular examples, the source code 402 may correspond to a portion of the source code 140. Thus, the source code 140 may include both of the flags 139 and 408. Accordingly, a portion of translations 152 and 154 corresponding to the source code 402 may be unit tests.

Figure 5:
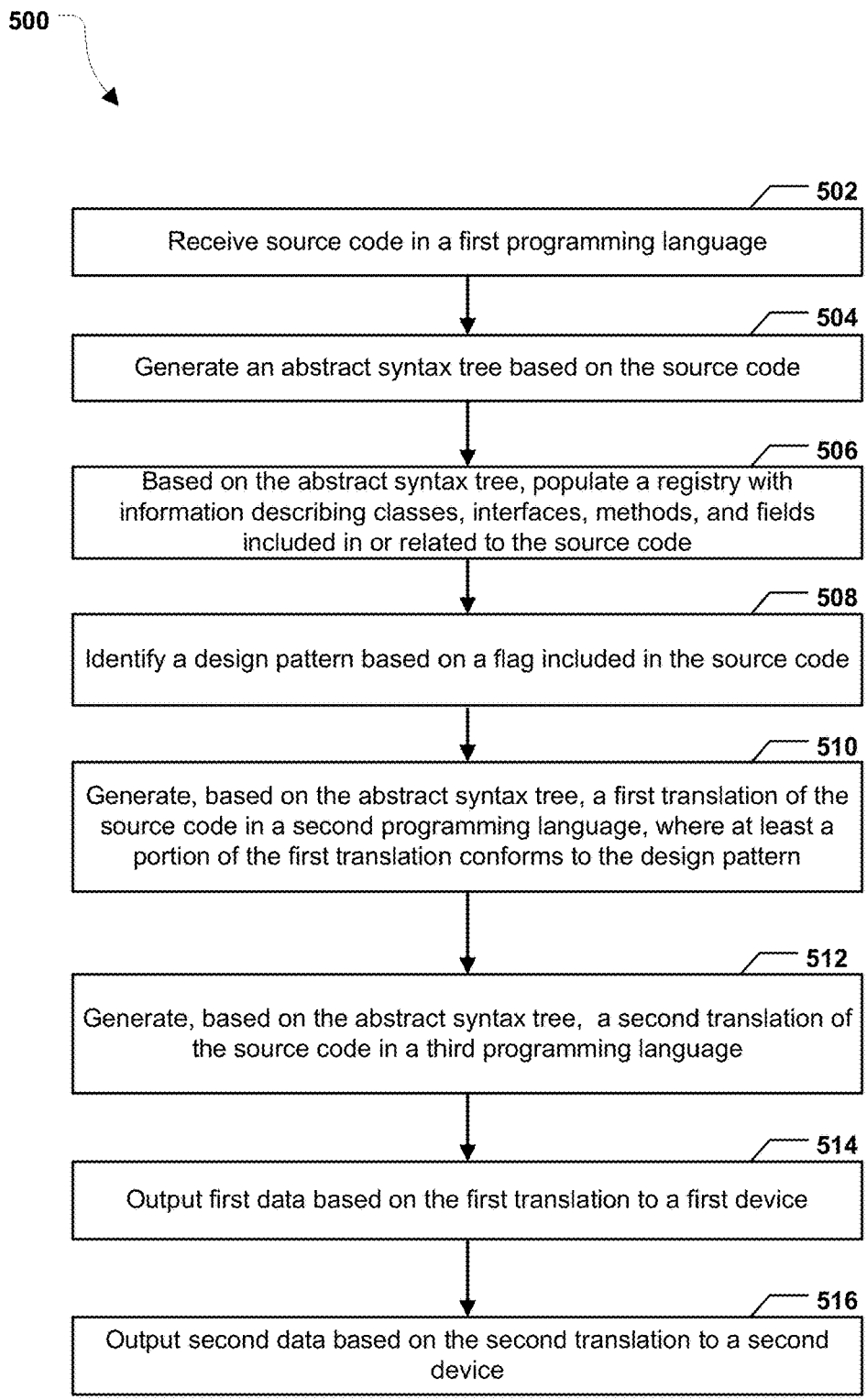
FIG. 5 is a flowchart of a particular embodiment of a method of converting source code.

Referring to FIG. 5, a flowchart of a particular embodiment of a method 500 of converting source code is shown. The method 500 may be executed by a computing device, such as the conversion and distribution device 102 of FIG. 1. The method 500 includes receiving source code in a first programming language, at 502. For example, the conversion and distribution device 102 may receive, via the communication interface 107, the source code 140. The source code 140 may include one or more files written in a first programming language (e.g., Java®).

The method 500 further includes generating an AST based on the source code, at 504. For example, the processor 104 may execute the AST builder 108 to generate one or more ASTs based on the source code 140. The method 500 further includes, based on the AST, populating a registry with information describing classes, interfaces, methods, and fields included in or related to the source code, at 506. For example, the processor 104 may execute the preprocessor 110 to populate the preprocess registry 112 based on the ASTs generated by the AST builder 108.

The method 500 further includes identifying a design pattern based on a flag included in the source code, at 508. For example, the preprocessor 110, the first converter 114, the second converter 116, or a combination thereof, executing at the processor 104 may identify the flag 139 included in the source code 140. The flag 139 may indicate that one of the design patterns 118 (e.g., the revealing prototype pattern) is to be used to generate a translation of the source code 140 or a portion (e.g., one or more classes, methods, etc.) of the source code 140.

The method 500 further includes generating, based on the AST, a first translation of the source code in a second programming language, where at least a portion of the first translation conforms to the design pattern, at 510. For example, the first converter 114 executing at the processor 104 may generate the first translation 152 (e.g., in JavaScript®) based on the AST(s) generated by the AST builder 108. A portion of the first translation 152 may conform to the design pattern indicated by the flag 139. The method 500 further includes generating, based on the AST, a second translation of the source code in a third programming language, at 412. For example, the second converter 116 executing at the processor 104 may generate the second translation 154 (e.g., in ActionScript®) based on the AST(s) generated by the AST builder 108.

The method 500 may further include outputting first data based on the first translation to a first device, at 514. For example, the conversion and distribution device 102 may transmit the first data 142 via the communication interface 107 to the first client device 128. The first data 142 may include the first translation 152 and/or a further translation of the first translation 152. In some examples, the first data 142 includes a package including the first translation 152 and/or a further translation of the first translation 152 as well as additional content referenced in the first translation 152 (e.g., code, media content, etc.). The method 500 may further include outputting second data based on the second translation to a second device, at 516. For example, the conversion and distribution device 102 may transmit the second translation 154 via the communication interface 107 to the second client device 130. The second data 144 may include the second translation 154 and/or a further translation of the second translation 154. In some examples, the second data 144 includes a package including the second translation 154 and/or a further translation of the second translation 154 as well as additional content referenced in the second translation 154 (e.g., code, media content, etc.).

Therefore, the method 500 may enable a device to generate multiple translations of source code. Furthermore, the method 500 may enable the device to determine a design pattern to be used to generate one or more of the translations based on a flag included in the source code. Accordingly, a device operating according to the method 500 may offer a more convenient solution to a programmer developing an application for multiple different platforms that manually creating source code for each different platform.

Figure 6:
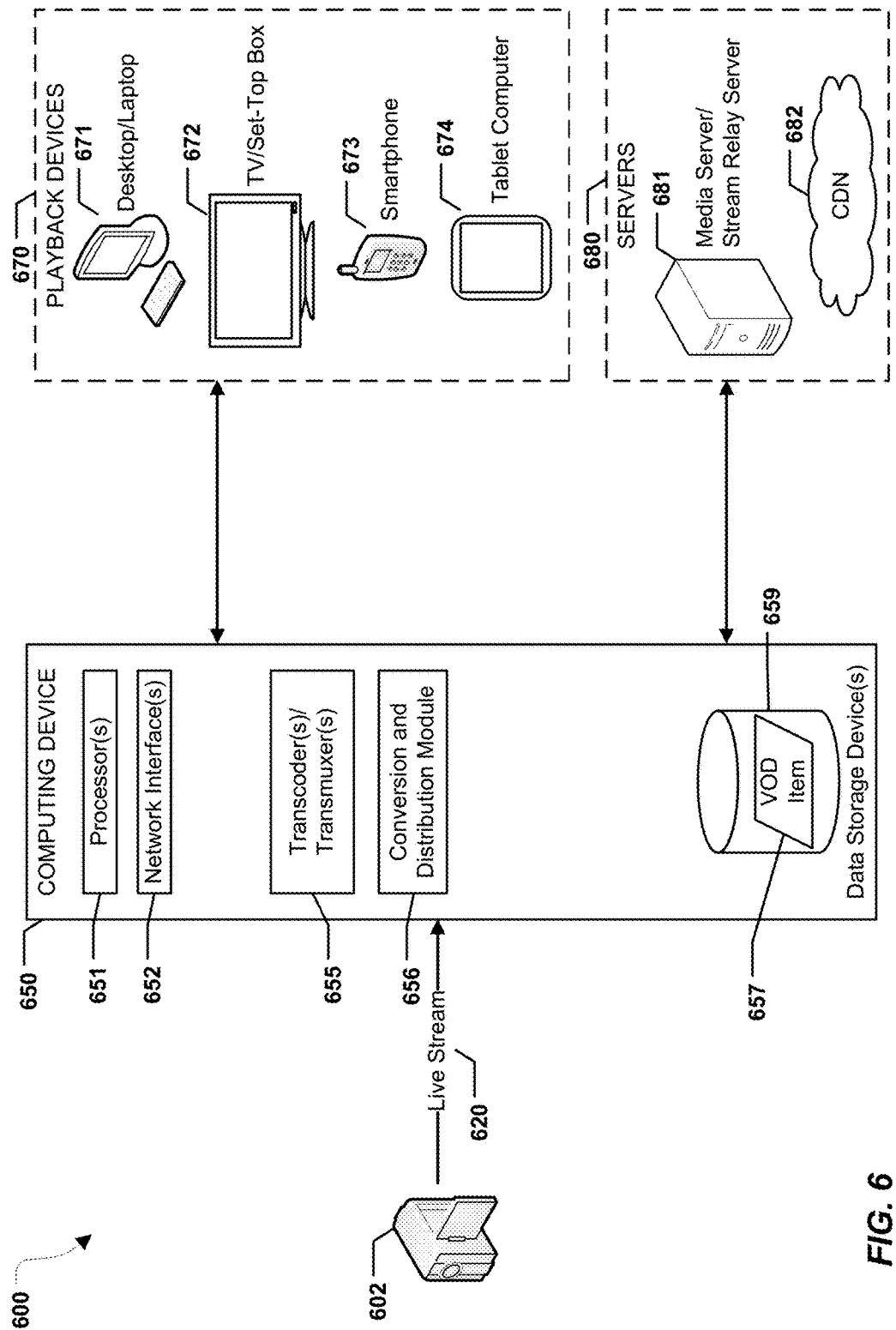
FIG. 6 is a block diagram of another particular embodiment of a system that is operable to convert and distribute an application.

FIG. 6 is a diagram to illustrate another particular embodiment of a system 600 that is operable to convert and distribute an application. The system 600 includes a computing device 650 that is configured to send data to and receive data from various other devices (e.g., via a network, such as a local area network (LAN) or the Internet). For example, the computing device 650 may communicate with one or more playback devices 670 (e.g., devices that are configured to stream video content) and one or more other servers 680. In an illustrative embodiment, the computing device 650 may correspond to the conversion and distribution device 102 of FIG. 1. In a particular embodiment, the playback devices 670 may correspond to the client devices 128 and 130. It should be noted that the illustrated playback devices 670 are examples. The playback devices 670 may include additional client devices and/or other types of devices capable of accessing webpages and/or playing media streams.

The computing device 650 may include one or more processors 651 and various components that are executable by the processor(s) 651. The computing device 650 may correspond to or include software application(s) that perform media serving or processing, hardware systems (e.g., servers) that support or perform media serving and processing, or any combination thereof. Thus, various operations described with reference to the computing device 650, or components thereof, may be implemented using hardware, software (e.g., instructions executable by the processor(s) 651), or any combination thereof.

The computing device 650 may include one or more network interfaces 652. For example, the network interface(s) 652 may include input interface(s) and output interface(s) that are configured to receive data and to send data, respectively. In a particular embodiment, the network interface(s) 652 may be wired and/or wireless interfaces that enable the computing device 650 to communicate data via a network, such as the Internet. For example, the network interface(s) 652 may include an Ethernet interface, a wireless interface compatible with an Institute of Electrical and Electronics Engineers (IEEE) 802.11 (e.g., Wi-Fi) protocol, or other wired or wireless interfaces.

The network interface(s) 652 may be configured to receive one or more media streams, such as an illustrative live media stream 620 from a capture source 602 (e.g., a camera) or a computing device that includes or is coupled to the capture source 602. The live media stream 620 may include audio data, video data, text data, closed captioning (CC) data, and/or subtitle data. The network interface(s) 652 may also be configured to transmit data to the one or more playback devices 670 (e.g., a smartphone, a tablet computer, a laptop computer, a desktop computer, a set-top box, a television, a portable media player, a game console, etc.). In the embodiment of FIG. 6, the playback devices 670 include a desktop/laptop computing device 671, a television (TV)/set-top box 672, a smartphone 673, and a tablet computer 674. The network interface(s) 652 may further be configured to transmit data to the one or more other servers 680 (e.g., a media server, a stream relay server, a server of a content distribution network (e.g., an edge server), etc.). In the embodiment of FIG. 6, the other servers 680 include a media server/stream relay server 681 and a server of a content distribution network (CDN) 682. In a particular embodiment, data transmitted to the playback devices 670 and to the servers 680 includes video streams. The video streams may be associated with the same encoding format and transmission protocol or may be associated with different encoding formats and transmission protocols. In a particular embodiment, generating the video streams includes performing video decoding, encoding, transcoding, and/or transmuxing operations at the computing device 650 (e.g., to modify a video encoding format, an audio encoding format, a bitrate, an aspect ratio, packaging, etc. relative to the incoming media stream 620). In a transmuxing operation, encoded audio and video may be repackaged without modifying the encoded audio and video.

The computing device 650 may include various components configured to perform stream processing functions. For example, the computing device 650 may include one or more video processing components, such as encoder(s), decoder(s), and/or transcoder(s)/transmuxer(s) 655, each of which may be implemented using hardware, software, or both. For example, the transcoder(s)/transmuxer(s) 655 may be executed by cloud-based virtual machines. A transcoder may be configured to perform encoding, decoding, bitrate conversion, codec conversion, frame size conversion, etc. Depending on a format of a received stream, a playback format supported by a requesting device, and/or transcoding parameters in use, a transcoding operation performed by the transcoder may trigger a decoding operation and/or a re-encoding operation. In a particular embodiment, parameters used by the transcoder are stored in one or more transcoding templates at the computing device 650. A transmuxer may be configured to repackage video data included in one container into a container of a different format. The transcoder(s)/transmuxer(s) 655 may thus enable the computing device 650 to process data in accordance with multiple coding technologies and protocols.

For example, the computing device 650 may support video encoding types including, but not limited to, H.264, on2® VP-based encoding (on2 is a registered trademark of Google Inc. of Mountain View, Calif.), Sorenson Spark® (Sorenson Spark is a registered trademark of Sorenson Media, Inc. of Salt Lake City, Utah), Screen video, Screen video 2, motion picture experts group (MPEG) 2 (MPEG-2), and MPEG-4 Part 2. The computing device 650 may support audio encoding types including, but not limited to, advanced audio coding (AAC), AAC low complexity (AAC LC), AAC high efficiency (HE-AAC), G.711, MPEG Audio Layer 3 (MP3), Speex, Nellymoser Asao, and AC-3.

The computing device 650 may support communication (e.g., adaptive streaming and non-adaptive streaming) protocols including, but not limited to, hypertext transfer protocol (HTTP) live streaming (HLS), HTTP dynamic streaming (HDS), smooth streaming, and MPEG dynamic adaptive streaming over HTTP (MPEG-DASH) (also known as international organization for standardization (ISO)/international electrotechnical commission (IEC) 23009-1). The computing device 650 may also support real time messaging protocol (RTMP) (and variants thereof), real-time streaming protocol (RTSP), real-time transport protocol (RTP), and MPEG-2 transport stream (MPEG-TS). Additional audio formats, video formats, coder/decoders (CODECs), and/or protocols may also be supported.

The computing device 650 may include one or more data storage devices 659 (e.g., random access memory (RAM), disk-based storage, etc.). The data storage device(s) 659 may store stream data (e.g., frames of a live video stream), files, closed caption data, images (e.g., to be overlaid on top of a video stream), and other data. In a particular embodiment, the data storage device(s) 659 store a video on demand (VOD) item 657. The VOD item 657 may include audio data, video data, text data, closed captioning (CC) data, and/or subtitle data. For example, the VOD item 657 may be a movie or a television show. Alternately, the VOD item 657 may be stored remote from the computing device 650 and may be accessible by the computing device 650 via a network (e.g., the Internet).

The computing device 650 may also include a conversion and distribution module 656. In an illustrative embodiment, the conversion and distribution module 656 includes functions as described with reference to the conversion and distribution device of FIG. 1 and/or the method 400 of FIG. 4. In a particular embodiment, the computing device 650 may support adaptive streaming. For example, the computing device 650 may be configured to generate an adaptive streaming master rendition list (e.g., a manifest). The master rendition list may include information describing adaptive bitrate renditions that are available for adaptive streaming. For example, the master rendition list may include a list of media chunk lists, where each media chunk list corresponds to a different adaptive bitrate rendition. Each media chunk list may list (e.g., provide resource locators, such as URLs, for) media chunks (e.g., segments) of the corresponding adaptive bitrate rendition. To initiate an adaptive streaming session, a destination device (e.g., one of the playback devices 670) may request the master rendition list. Upon receiving the master rendition list, the destination device may determine which of the available renditions should be requested from the computing device 650. For example, the destination device may make such a determination based on buffering/processing capability at the destination device and/or network conditions (e.g., bandwidth) being experienced by the destination device.

Upon determining which rendition should be requested, the destination device may transmit a request to the computing device 650. The request may specify a particular rendition (or the corresponding media chunk list). In response to the request, the computing device 650 may transmit the corresponding media chunk list to the destination device. Using the media chunk list, the destination device may generate a media chunk request for a particular portion of the requested rendition. The particular portion may be specified using start/end frame numbers, start/end times, a portion number/identifier, etc. Depending on the adaptive streaming protocol in use, the requested portion may correspond to a "chunk" of a rendition and/or a group of pictures (GOP). A "chunk" may refer to a fixed (e.g., ten seconds) or variable length duration of a stream rendition. A group of pictures may refer to a collection of video frames that includes one or more intra-coded frames (I-frames) and one or more additional frames that include difference information relative to the one or more I-frames (e.g., P-frame and/or B-frames). If there are no problems with receipt and playback of the requested portion, the destination device may request a subsequent portion (e.g., portion "X+1") of the same rendition. However, if playback and/or network conditions become worse, the destination device may switch to a lower bitrate rendition by requesting subsequent portions of the lower bitrate rendition (e.g., may request and receive a different media chunk list associated with the lower bitrate rendition to use to request media chunks). Conversely, if playback and/or network conditions improve, the destination device may switch to a higher bitrate rendition (e.g., may request and receive a different media chunk list associated with the higher bitrate rendition to use to request media chunks). The computing device 650 may generate key frame aligned portions for the adaptive streaming renditions, so that switching to a lower bitrate or higher bitrate rendition appears "seamless" (e.g., does not result in noticeable visual glitches or dropped frames).

During operation, the computing device 650 may send a video player application to a computing device, such as one of the playback devices 670. The video player application may be generated based on source code written in a different language and based on one or more flags included in the source code. In a particular embodiment, the video player application may correspond to one of the first data 142 and the second data 144 of FIG. 1.

It should be noted that the orders of steps described with reference to FIGS. 1-6 are to be considered illustrative, not limiting. In alternate embodiments, the order of steps may be different. Further, one or more steps may be optional and/or replaced by other steps. In addition, one or more steps may be consolidated. In accordance with various embodiments of the present disclosure, one or more methods, functions, and modules described herein may be implemented by software programs executable by a computer system. Further, implementations can include distributed processing, component/object distributed processing, and/or parallel processing.

Particular embodiments can be implemented using a computer system executing a set of instructions that cause the computer system to perform any one or more of the methods or computer-based functions disclosed herein. A computer system may include a laptop computer, a desktop computer, a server computer, a mobile phone, a tablet computer, a set-top box, a media player, one or more other computing devices, or any combination thereof. The computer system may be connected, e.g., using a network, to other computer systems or peripheral devices. For example, the computer system or components thereof can include or be included within any one or more of the workstation 124 of FIG. 1, the conversion and distribution device 102 of FIG. 1, the first client device 128 of FIG. 1, the second client device 130 of FIG. 1, the computing device 650 of FIG. 6, the desktop/laptop computing device 671 of FIG. 6, the TV/set-top box 672 of FIG. 6, the smartphone 673 of FIG. 6, the tablet computer 674 of FIG. 6, the media server/stream relay server 681 of FIG. 6, a server (e.g., edge server) of the CDN 682 of FIG. 6, or any combination thereof.

In a networked deployment, the computer system may operate in the capacity of a server or as a client user computer in a server-client user network environment, or as a peer computer system in a peer-to-peer (or distributed) network environment. The term "system" can include any collection of systems or sub-systems that individually or jointly execute a set, or multiple sets, of instructions to perform one or more computer functions.

In a particular embodiment, the instructions can be embodied in a computer-readable storage device or a processor-readable storage device. The terms "computer-readable storage device" and "processor-readable storage device" include a single storage device or multiple storage devices, such as a centralized or distributed database, and/or associated caches and servers that store one or more sets of instructions. The terms "computer-readable storage device" and "processor-readable storage device" also include any device that is capable of storing a set of instructions for execution by a processor or that cause a computer system to perform any one or more of the methods or operations disclosed herein. For example, a computer-readable or processor-readable storage device may include random access memory (RAM), flash memory, read-only memory (ROM), programmable read-only memory (PROM), erasable programmable read-only memory (EPROM), electrically erasable programmable read-only memory (EEPROM), registers, a hard disk, a removable disk, a disc-based memory (e.g., compact disc read-only memory (CD-ROM)), a solid-state memory, or any other form of storage device. A computer-readable or processor-readable storage device is not a signal.

As used herein, a "live" stream may differ from a "video on demand" (VOD) stream. A VOD stream originates from, or corresponds to, content that is available in its entirety at a stream source when a packet of the VOD stream is sent. For example, a VOD stream may correspond to a movie or television show that is stored at a storage device. A live stream corresponds to content that is not available in its entirety when a packet of the live stream is sent. For example, a live stream may be used to transmit audio and/or video content corresponding to an event as the event is being captured (e.g., in real-time or near-real-time). Examples of such events may include, but are not limited to, in-progress sporting events, musical performances, video-conferences, and webcam feeds. It should be noted that a live stream may be delayed with respect to the event being captured (e.g., in accordance with government or industry regulations, such as delay regulations enforced by the Federal Communications Commission (FCC)). In addition to such live feeds, the described systems and methods may also be used in conjunction with "live linear television (TV)" streams. A live linear TV stream may correspond to a VOD asset being rebroadcast as a live feed. It should also be noted that although certain embodiments may be described herein with reference to video on demand, not all of the described techniques may require video content or data. Certain embodiments may also be used on demand content that does not include video (e.g., audio on demand radio or music streams).

In a particular embodiment, a method includes receiving source code in a first programming language. The method further includes identifying a design pattern based on a flag included in the source code. The method further includes generating a first translation of the source code in a second programming language, where at least a portion of the first translation conforms to the design pattern. The method further includes generating a second translation of the source code into a third programming language. The method further includes outputting first data based on the first translation to a first device and outputting second data based on the second translation to a second device.

In another particular embodiment, an apparatus includes a memory storing instructions. The apparatus further includes a processor configured to execute the instructions to receive source code in a first programming language. The processor is further configured to execute the instructions to identify a design pattern based on a flag included in the source code. The processor is further configured to generate a first translation of the source code in a second programming language, where at least a portion of the first translation is formatted according to the design pattern. The processor is further configured to generate a second translation of the source code in a third programming language. The apparatus further includes communication interface to output first data based on the first translation to a first device and to output second data based on the second translation to the second device.

In another particular embodiment, a computer-readable storage device stores instructions that, when executed by a computer, cause the computer to perform operations that include receiving source code in a first programming language. The operations further include identifying a design pattern based on a flag included in the source code. The operations further include generating a first translation of the source code in a second programming language, where at least a portion of the second file conforms to the design pattern. The operations further include generating a second translation of the source code in a third programming language. The operations further include initiating output of data based on the first translation to a first device and initiating output of data based on the second translation to a second device.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   receiving a command to convert an application associated with a first programming language into a first version and a second version;
   accessing source code of the application by a first converter to generate a first translation of the source code in a second programming language, wherein, responsive to detecting a first flag in the source code indicating a design pattern, the first converter conforms at least a portion of the first translation to the design pattern;
   accessing the source code by a second converter to generate a second translation of the source code in a third programming language that differs from the second programming language, wherein, responsive to detecting the first flag in the source code, the second converter conforms at least a portion of the second translation to the design pattern;
   after identifying a second flag in the source code and identifying a unit test portion of the source code based on the second flag, the unit test portion including first unit tests in the first programming language, generating second unit tests in the second programming language that are associated with the first translation and that correspond to the first unit tests, third unit tests in the third programming language that are associated with the second translation and that correspond to the first unit tests, or a combination thereof, wherein the second unit tests are generated by the first converter, and wherein the third unit tests are generated by the second converter; and
   outputting the first translation and the second translation to a first device and a second device, respectively.

2. The method of claim 1, wherein:
   the command is received at a computing device that includes three or more converters corresponding to different programming languages, each of the converters including a node visitor class and being configured to convert the source code to a target language based on a generated abstract syntax tree and based on one or more node classes,
   the command causes the computing device to select the first converter and the second converter from among the three or more converters, and
   the design pattern corresponds to a prototype pattern, a revealing prototype pattern, a revealing module pattern, or a combination thereof.

3. The method of claim 1, further comprising:
   generating an abstract syntax tree based on the source code; and based on the abstract syntax tree, populating a registry with information describing classes, interfaces, methods, fields, or any combination thereof, included in or related to the source code, wherein each of the first converter and the second converter is configured to generate output based on each node of the abstract syntax tree and based on one or more node visitor classes.

4. The method of claim 1, wherein:
the first translation and the second translation are each generated based on multiple abstract syntax trees,
the second programming language is different from the third programming language, and
the first device and the second device support the first version and the second version, respectively.

5. The method of claim 1, wherein:
the first converter and the second converter each include one or more node visitor classes, each node visitor class defines methods corresponding to a plurality of node types, and generating the first translation includes:
using a visitor pattern to visit each node of multiple abstract syntax trees, the multiple abstract syntax trees each generated in response to the command and based on the source code; and
processing one or more visited nodes based on rules to generate the first translation, the rules included in the first converter and the second converter and associated with the first flag and the second flag.

6. The method of claim 1, wherein the second programming language and the third programming language comprise high-level languages, and further comprising performing static code analysis at a computing device to determine whether the source code, the first translation, the second translation, or a combination thereof, includes an error.

7. The method of claim 1, wherein:
the source code is an object oriented programming language,
the second programming language does not support object oriented programming, and
the design pattern indicates a revealing prototype design pattern that is configured to utilize prototypes and to simulate object oriented programming in the second programming language.

8. The method of claim 1, wherein outputting the first translation to the first device comprises providing the first device with a converted version of the source code enabled for compiling at the first device, and wherein outputting the second translation to the second device comprises providing the second device with a converted version of the source cod enabled for compiling at the second device.

9. The method of claim 1, further comprising initiating an abstract syntax tree builder in response to the command, the abstract tree builder configured to build an abstract syntax tree that does not include a representation of the first flag and the second flag.

10. The method of claim 1, wherein the first translation and the second translation correspond to a first version of a video player application executable at the first device and a second version of the video player application executable at the second device, respectively.

11. An apparatus comprising:
a memory storing instructions;
a processor configured to execute the instructions to:
receive source code, in a source programming language and including a first flag, of an application, the application configured to facilitate access to a web page, provision of media content to a user of a client device, or a combination thereof;
identify a unit test portion of the source code based on a second flag included in the source code;
generate, by a first and second converters, a first translation into a first programming language of the source code and a second translation into a second programming language of the source code, respectively, wherein:
the first programming language and the second programming language differ, responsive to detecting the second flag in the source code, the processor is configured to generate first unit tests in the first programming language that are associated with the first translation and that correspond to the unit test portion, second unit tests in the second programming language that are associated with the second translation and that correspond to the unit test portion, or a combination thereof, wherein the first unit tests and the second unit tests are generated by the first and second converters, respectfully; and
a communication interface configured to:
output first data based on the first translation to a first device, the first device configured to support the application in the first programming language; and
output second data based on the second translation to a second device, the second device configured to support the application in the second programming language.

12. The apparatus of claim 11, wherein the processor is further configured to add to the first translation one or more statements associated with importing a package associated with unit testing in the second programming language.

13. The apparatus of claim 11, wherein the processor is further configured to execute the instructions to:
generate an abstract syntax tree based on the source code; and
based on the abstract syntax tree, populate a registry with information describing classes, interfaces, methods, fields, or any combination thereof, included in or related to the source code.

14. The apparatus of claim 13, wherein the first translation and the second translation are generated based on the abstract syntax tree.

15. A computer-readable storage device storing instructions that, when executed by a processor, cause the processor to perform operations comprising:
receiving source code, in a source programming language and including a first flag, of an application, the application configured to facilitate accessing a web page, providing media content to a user of a client device, or a combination thereof;
identifying a unit test portion of the source code based on a second flag included in the source code;
generating, by a first converter, a first translation into a first programming language of the source code and generating, by a second converter, a second translation into a second programming language of the source code that differs from the first programming language, wherein, responsive to identifying the second flag in the source code, the processor is configured to generate first unit tests in the first programming language that are associated with the first translation and that correspond to the unit test portion, second unit tests in the second programming language that are associated with the second translation and that correspond to the unit test portion, or a combination thereof, wherein the first unit tests are generated by the first converter, and wherein the second unit tests are generated by the second converter;

initiating output of first data based on the first translation to a first device, the first device configured to support the application in the first programming language; and initiating output of second data based on the second translation to a second device, the second device configured to support the application in the second programming language.

16. The computer-readable storage device of claim 15, wherein the second data is excluded from the first data sent to the first device.

17. The computer-readable storage device of claim 15, wherein the operations further include:

generating an abstract syntax tree based on the source code; and based on the abstract syntax tree, populating a registry with information describing classes, interfaces, methods, fields, or any combination thereof, included in or related to the source code.

18. The computer-readable storage device of claim 17, wherein execution of the instructions causes the processor to generate the first translation and the second translation by traversing nodes of the abstract syntax tree.

19. The computer-readable storage device of claim 18, wherein generating the first translation and the second translation includes processing each node of the abstract syntax tree using a visitor pattern.

20. The computer-readable storage device of claim 15, wherein the operations further include performing static code analysis to determine whether the source code, the first translation, the second translation, or a combination thereof, includes an error.

* * * * *

UNITED STATES PATENT AND TRADEMARK OFFICE
CERTIFICATE OF CORRECTION

PATENT NO. : 10,140,105 B2
APPLICATION NO. : 15/067003
DATED : November 27, 2018
INVENTOR(S) : Scott Kellicker and Jan Borgersen Page 1 of 1

It is certified that error appears in the above-identified patent and that said Letters Patent is hereby corrected as shown below:

In the Claims

Column 17, Line 50:
"cod" should read --code--

Column 18, Lines 21-22:
"respectfully" should read --respectively--

Signed and Sealed this
Thirteenth Day of August, 2019

Andrei Iancu
*Director of the United States Patent and Trademark Office*